Patented Feb. 10, 1953

2,628,240

UNITED STATES PATENT OFFICE 2,628,240

3-BETA-HYDROXY-5,7,9(11)-PREGNA-TRIENE-12,20-DIONE

Robert H. Levin, A Vern McIntosh, Jr., and George B. Spero, Kalamazoo, Mich., assignors to The Upjohn Company, Kalamazoo, Mich., a corporation of Michigan No Drawing. Application June 15, 1951,
Serial No. 231,904

1 Claim. (Cl. 260—397.4)

The present invention relates to 3-beta-hydroxy-5,7,9(11)-pregnatriene-12,20-dione and to a process for its production.

This application is a continuation-in-part of our co-pending application Serial No. 184,702, filed September 13, 1950, to which reference is made also for the preparation of the starting compounds referred to in this specification.

The 3-beta-hydroxy-5,7,9(11)-pregnatriene-12,20-dione of this invention is represented by the following formula:

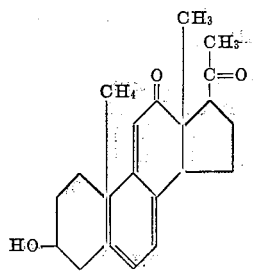

The principal object of the present invention is to provide a novel compound which is useful in the preparation of steroid compounds containing an oxygen atom at carbon atom 11 in the steroid nucleus. Another object of the present invention is to provide a process for the production of this new compound. Other objects and advantages of the invention, some of which are referred to hereinafter, will be apparent to those skilled in the art to which the invention pertains.

The compound of the present invention is useful in the preparation of steroid compounds having an oxygen atom attached to carbon atom 11. Such oxygen-containing steroids are of particular interest because of the biological activity of the adrenal cortical hormones and certain known derivatives thereof, which differ markedly in their biological effects from steroids that lack oxygen in their constitution. Because of the present acute shortage of adrenal cortical hormones and the lack of methods for their synthesis, the compound of the present invention offers promise as a starting material for the production of oxygen-containing steroids possessing desirable biological activity.

3-beta-hydroxy-5,7,9(11)-pregnatriene-12,30-dione is a colorless crystalline solid, which, when pure, has a melting point of 201.5-203 degrees centigrade. The steroid nucleus of the compound may be partially or completely saturated by hydrogenation. The compound and its partially or completely nuclearly saturated derivatives are also convertible to 3-keto derivatives, as more fully described and claimed in our co-pending application Serial No. 264,648 filed January 2, 1952. The 3-hydroxyl group is also capable of acylation to provide 3-acyloxy derivatives which are disclosed and claimed in our co-pending application Serial No. 228,134 filed May 24, 1951.

The starting compounds from which 3-beta-hydroxy-5,7,9(11)-pregnatriene-12,20-dione is prepared in accordance with the process of our invention are 3-beta-acyloxy-5,7,9(11)-pregnatriene-12,20-diones, which can be obtained as originally disclosed in our co-pending application Serial No. 184,702, filed September 13, 1950, by procedure which consists essentially of the following:

(1) Dehydroergosterol is converted to an adduct with maleic anhydride or maleic acid [H. Honigmann, Annalen 508, 89-98 (1934)].

(2) The adduct of dehydroergosterol is esterified by reaction, for example, with benzoyl chloride, acetyl chloride or formic acid.

(3) The resulting adduct of the 3-beta-acyloxy-dehydroergosterol is ozonized and then reduced in acid solution with zinc dust to obtain an adduct of a 3-beta-acyloxybisnor-5,7,9(11)-cholatrien-22-al. (See application of Robert H. Levin, Serial No. 111,100, filed August 18, 1949, for details.)

(4) An enol ester of the resulting 3-beta-acyloxy-bisnor-5,7,9(11)-cholatrien-22-al adduct is prepared and ozonized to the adduct of a 3-beta-acyloxy-5,7,9(11)-pregnatrien-20-one.

(5) The resulting adduct of the 3-beta-acyloxy-5,7,9(11)-pregnatrien-20-one is reacted with N-bromosuccinimide or bromine to produce an adduct of a 3-beta-acyloxy-12-bromo-5,7,9(11)-pregnatrien-20-one.

(6) The adduct of the 3-beta-acyloxy-12-bromo-5,7,9(11)-pregnatrien-20-one, on reaction with silver nitrate as described in our co-pending application Serial No. 228,131 filed May 24, 1951, yields the adduct of a 3-beta-acyloxy-12-hydroxy-5,7,9(11)-pregnatrien-20-one. Other methods for the preparation of the 12-hydroxy compound are described in our co-pending application Serial No. 228,132 filed May 24, 1951.

(7) The adduct of the 3-beta-acyloxy-12-hydroxy-5,7,9(11)-pregnatrien-20-one is then oxidized with chromic acid, as described in our co-pending application Serial No. 228,133 filed May 24, 1951, to obtain an adduct of a 3-beta-acyloxy-5,7,9(11)-pregnatrien-12,20-dione.

(8) The adduct radical of the resulting 3-beta-acyloxy-5,7,9(11)-pregnatriene-12,20-dione is then removed by heating the adduct in the presence of an amine, to obtain the 3-beta-acyloxy-5,7,9(11)-pregnatriene-12,20-dione, as more fully described and claimed in our copending application Serial No. 228,134 filed May 24, 1951.

In accordance with the process of this invention, the 3-beta-acyloxy-5,7,9(11)-pregnatriene-12,20-dione thus obtained, having the formula

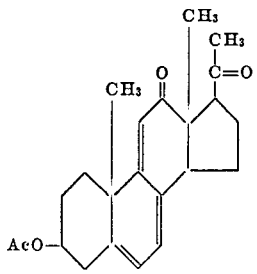

in which Ac is an acyl radical or the residue of an organic carboxylic acid, especially those aliphatic carboxylic acids containing from 1 to 8 carbon atoms, inclusive, per molecule, is converted to the desired 3-hydroxy compound by saponification in an alcohol such as methanol, or in dioxane or other solvent, using at least one equivalent of an aqueous base. The product is isolated from the reaction mixture by drowning out with water or in other conventional manner, and may be purified by recrystallization from an organic slovent, if desired. The AcO radical of the foregoing formula may be that derived from carboxylic acids such as formic, acetic, propionic, butyric, valeric, hexanoic, heptanoic, octanoic, succinic, glutaric, cyclopentanoic, cyclohexanoic, benzoic, toluic and the like; compounds in which the AcO radical is derived from lower aliphatic carboxylic acids of this group are preferred starting materials for the preparation of the compounds of this invention. Compounds in which the AcO radical of the foregoing formula is derived from carboxylic acids substituted by halogen, alkyl and alkoxy radicals may also be used.

The bases which may be used in the saponification of 3-beta-acyloxy-5 7,9(11)-pregnatriene-12,20-diones to the desired 3-beta-hydroxy compound include sodium hydroxide, potassium hydroxide, barium hydroxide, calcium hydroxide and similar water-soluble alkali and alkaline-earth metal hydroxides and oxides, as well as water-soluble alkali-metal carbonates such as sodium carbonate and potassium carbonate.

In the following example, the compound of the invention and a preferred method for its preparation are described.

*Example.—3-beta-hydroxy-5,7,9(11)-pregnatriene-12,20-dione*

To a solution of 120 milligrams of 3-beta-acetoxy-5,7,9(11)-pregnatriene-12,20-dione (melting point, 160–162 degrees centigrade, prepared as described in our copending application Serial No. 228,134, filed May 24, 1951, in 9 milliliters of methanol was added a solution of 90 milligrams of potassium carbonate in 15 milliliters of water. The resulting solution was allowed to stand at room temperature for 20 minutes, during which period the product started to crystallize. Ten (10) milliliters of water was added to the solution and the mixture was allowed to cool further for a period of 2 hours. The crystals were then separated by filtration. A yield of 70 milligrams of product having a melting point of 200–203 degrees centigrade was obtained. By recrystallizing this product from dilute aqueous methanol, the pure 3-beta-hydroxy-5,7,9(11)-pregnatriene-12,20-dione, having a melting point of 201.5–203 degrees centigrade, was obtained.

Analysis:
Calculated for $C_{21}H_{26}O_3$__ C 77.26   H 8.03
Found _____ 77.78      7.54
                        78.13      8.04

$[alpha]_D^{26} +88.2$ degrees (chloroform).

Other starting 3-beta-acyloxy compounds and other methods for the preparation of the compound may be adopted in accordance with the principles described herein.

3 - beta - hydroxy - 5,7,9(11)-pregnatriene-12,20-dione may be hydrogenated in steps to produce compounds in which the steroid nucleus is partially or completely saturated. When it is hydrogenated at a superatmospheric pressure in the presence of a palladium catalyst (for example, 10 percent palladium on calcium carbonate or 20 percent palladium on charcoal), 3-beta-hydroxy-8(9)-pregnene-12,20-dione,

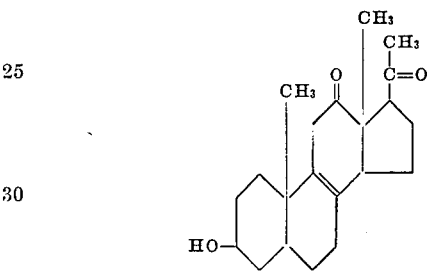

is the product when the reduction is stopped after absorption of 2 molecular proportions of hydrogen. If the hydrogenation is continued, 3-beta-hydroxypregnane-12,20-dione

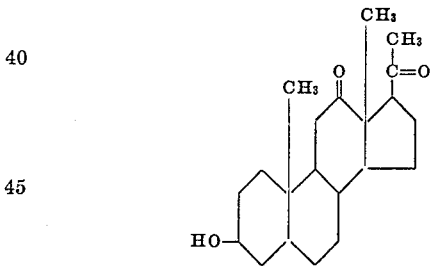

is formed.

It is to be understood that the invention is not to be limited to the exact details of operation or exact compounds shown and described, as obvious modifications and equivalents will be apparent to those skilled in the art to which the invention pertains, and that the invention is to be limited solely by the scope of the appended claims.

We claim:

3 - beta - hydroxy - 5,7,9(11) - pregnatriene-12,20-dione.

ROBERT H. LEVIN.
A VERN McINTOSH, Jr.
GEORGE B. SPERO.

REFERENCES CITED

The following references are of record in the file of this patent:

UNITED STATES PATENTS

| Number | Name | Date |
|---|---|---|
| 2,447,325 | Gallagher | Aug. 17, 1948 |

FOREIGN PATENTS

| Number | Country | Date |
|---|---|---|
| 594,878 | Great Britain | Nov. 21, 1947 |